US011448749B1

(12) United States Patent
Judd et al.

(10) Patent No.: US 11,448,749 B1
(45) Date of Patent: Sep. 20, 2022

(54) TAG THAT ENHANCES VEHICLE RADAR VISIBILITY OF OBJECTS

(71) Applicant: Triad National Security, LLC, Los Alamos, NM (US)

(72) Inventors: Stephen Judd, Los Alamos, NM (US); David Guenther, Los Alamos, NM (US); Nicholas Dallmann, Los Alamos, NM (US); William Mairson, Los Alamos, NM (US)

(73) Assignee: Triad National Security, LLC, Los Alamos, NM (US)

( * ) Notice: Subject to any disclaimer, the term of this patent is extended or adjusted under 35 U.S.C. 154(b) by 622 days.

(21) Appl. No.: 16/128,123

(22) Filed: Sep. 11, 2018

Related U.S. Application Data

(60) Provisional application No. 62/566,559, filed on Oct. 2, 2017.

(51) Int. Cl.
*G01S 13/76* (2006.01)
*H01Q 1/52* (2006.01)
*G01S 13/931* (2020.01)
*H01Q 1/32* (2006.01)
*H01Q 9/04* (2006.01)
*H01Q 1/27* (2006.01)

(52) U.S. Cl.
CPC .......... *G01S 13/767* (2013.01); *G01S 13/931* (2013.01); *H01Q 1/3233* (2013.01); *H01Q 1/525* (2013.01); *H01Q 1/273* (2013.01); *H01Q 9/0407* (2013.01)

(58) Field of Classification Search
CPC ... G01S 13/767; G01S 13/931; H01Q 1/3233; H01Q 1/525; H01Q 1/273; H01Q 9/0407
USPC ..................................................... 342/51, 42
See application file for complete search history.

(56) References Cited

U.S. PATENT DOCUMENTS

| 5,675,342 A | * | 10/1997 | Sharpe | G07B 15/063 340/10.2 |
| 2013/0207831 A1 | * | 8/2013 | Fullerton | G01S 13/756 342/51 |

OTHER PUBLICATIONS

Naoyuki Yamada, "Radar Cross Section for Pedestrian in 76GHz Band," R&D Review of Toyota CRDL, vol. 39, No. 4, pp. 46-51, http://www.tytlabs.com/english/review/rev394epdf/e394_046yamada.pdf (2004).

(Continued)

*Primary Examiner* — Bo Fan
(74) *Attorney, Agent, or Firm* — LeonardPatel PC; Michael Aristo Leonard, II; Sheetal Suresh Patel

(57) ABSTRACT

A tag enhances vehicle radar visibility of objects by increasing the effective radar cross-section of the object, allowing detection at longer ranges and providing the vehicle/driver with more time to avoid a collision. The tag may include a receive antenna and a bandpass filter configured to receive a signal from the receive antenna and to allow a portion of the frequency range of the signal from the receive antenna through. The tag may also include an amplifier configured to receive and amplify the signal with the portion of the frequency range from the bandpass filter. The tag may further include a transmit antenna configured to transmit the amplified signal. The receive antenna, the transmit antenna, and the amplifier may be configured such that antenna-to-antenna isolation between the receive antenna and the transmit antenna is greater than a gain of the amplifier.

18 Claims, 7 Drawing Sheets

(56) References Cited

OTHER PUBLICATIONS

Naoyuki Yamada, "Three-Dimensional High Resolution Measurement of Radar Cross Section for Car in 76 GHz Band," http://www.tytlabs.com/english/review/rev362epdf/e362_064yamada.pdf (2004).
Pak Chan and V. Fusco, "an 8- to 12-Ghz Wideband Negative Resistance Reflection Amplifier," Microwave and Optical Technology Letters, vol. 54, No. 3, pp. 553-555 (Mar. 2012).

\* cited by examiner

TAG THAT ENHANCES VEHICLE RADAR VISIBILITY OF OBJECTS

CROSS REFERENCE TO RELATED APPLICATION

This application claims the benefit of U.S. Provisional Patent Application No. 62/566,559 filed Oct. 2, 2018. The subject matter of this earlier-filed application is hereby incorporated by reference in its entirety.

STATEMENT OF FEDERAL RIGHTS

The United States government has rights in this invention pursuant to Contract No. DE-AC52-06NA25396 between the United States Department of Energy and Los Alamos National Security, LLC for the operation of Los Alamos National Laboratory.

FIELD

The present invention generally relates to electronic tags, and more particularly, to a tag that enhances vehicle radar visibility of objects.

BACKGROUND

Vehicle anti-collision radars are designed to detect other vehicles some distance away and alert the driver or automatically apply the vehicle brakes to avoid a collision. Compared to cars and trucks, motorcycles and bicycles have a much lower radar cross-section, and hence, are not detected until the vehicle is much closer—if they are detected at all. Similarly, people, animals, and smaller inanimate objects may also have a lower radar cross-section (RCS). Accordingly, a mechanism to improve the radar cross-section of motorcycles, bicycles, personnel, animals, and/or other objects may be beneficial.

SUMMARY

Certain embodiments of the present invention may provide solutions to the problems and needs in the art that have not yet been fully identified, appreciated, or solved by conventional bicycle and motorcycle detection systems. For example, some embodiments pertain to a tag that enhances vehicle radar visibility of motorcycles, bicycles, personnel, animals, or any other suitable living or non-living object.

In an embodiment, a tag includes a first antenna configured to receive a signal and a bandpass filter configured to receive the signal from the first antenna and to allow a portion of a frequency range of the signal from the first antenna through. The tag also includes an amplifier configured to receive and amplify the filtered signal from the bandpass filter, such that the amplified signal is more powerful than the received signal.

In another embodiment, a tag includes a receive antenna configured to receive a signal and a bandpass filter configured to receive the signal from the receive antenna and to allow a portion of a frequency range of the signal from the receive antenna through. The tag also includes an amplifier configured to receive and amplify the filtered signal from the bandpass filter. The tag further includes a transmit antenna configured to transmit the amplified signal. The receive antenna, the transmit antenna, and the amplifier are configured such that antenna-to-antenna isolation between the receive antenna and the transmit antenna is greater than a gain of the amplifier.

In yet another embodiment, a tag includes a plurality of antennas, where at least two of the plurality of antennas are oriented in different directions. The tag also includes a bandpass filter configured to receive a signal from at least one of the plurality of antennas and to allow a portion of a frequency range of the received signal through. The tag further includes an amplifier configured to receive and amplify the filtered signal from the bandpass filter, such that the amplified signal is significantly more powerful than the received signal. The plurality of antennas of the tag are oriented such that radar signals from vehicles approaching from at least two directions can be received, amplified, and retransmitted with a larger RCS.

BRIEF DESCRIPTION OF THE DRAWINGS

In order that the advantages of certain embodiments of the invention will be readily understood, a more particular description of the invention briefly described above will be rendered by reference to specific embodiments that are illustrated in the appended drawings. While it should be understood that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE EMBODIMENTS

Figure 1:
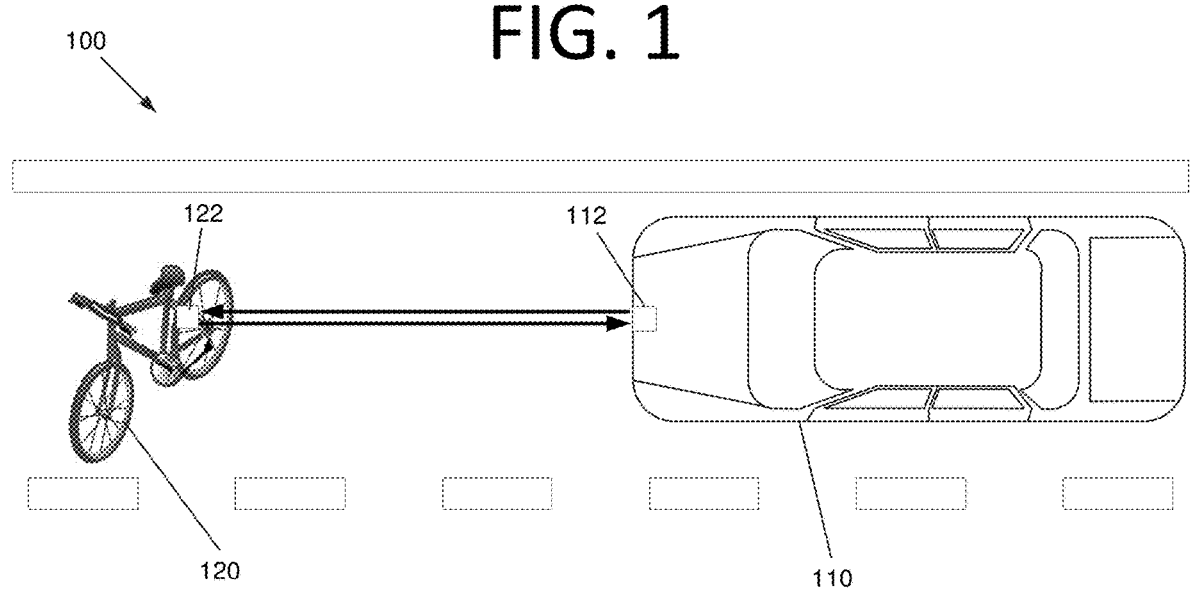
FIG. 1 illustrates a system configured to enhance vehicle detection of objects, according to an embodiment of the present invention.

Some embodiments of the present invention pertain to a tag that enhances vehicle radar visibility of objects. As used herein, an "object" may be a bicycle, a motorcycle, a person, an animal, a tree, a construction cone or barrel, a concrete barrier, a mailbox, a traffic light, or any other suitable living or non-living object without deviating from the scope of the invention. Also, "vehicle" may be a car, truck, train, tractor trailer, construction vehicle, or any radar-equipped vehicle without deviating from the scope of the invention. The tag of some embodiments is a small and low cost powered tag that presents a relatively large signal to vehicle anti-collision radars. When placed on a smaller object, such as a motorcycle or bicycle, the tag greatly increases the effective radar cross-section of the object, allowing detection at longer ranges and providing the vehicle/driver with more time to avoid a collision.

The tag may be a repeater device that includes one or two antennas and an amplifier. In one antenna implementations, a circulator or a reflection-type amplifier (also known as a negative resistance amplifier) may be used. Radar signals are received, amplified, and re-transmitted back to the radar at higher (and in some embodiments, much higher) power levels than would be reflected by the object. Because no signal processing is performed in some embodiments, the tag works with all radars regardless of modulation format.

The tag of some embodiments is a counter-intuitive device to an RF designer because it looks like it will self-oscillate as the re-transmitted signal is coupled back into the receive antenna. Positive feedback is typically extremely undesirable to RF designers. However, as long as the antenna-to-antenna isolation is higher than the amplifier gain, the tag will not self-oscillate. Indeed, with proper spacing and trace lengths, the tag of some embodiments can be made into a form of negative-feedback amplifier, which is a different way of implementing the tag. Further discussion of an example modern negative resistance amplifier is found, for instance, in Pak Chan and V. Fusco, "an 8- to 12-Ghz Wideband Negative Resistance Reflection Amplifier," Microwave and Optical Technology Letters, Vol. 54, No. 3, pp. 553-555 (March 2012). Higher antenna gains generally result in smaller side-lobes and higher overall tag gains, improving the overall system.

In a normal radar, the radar transmits a radio frequency (RF) signal and a small fraction of that signal is reflected back to the radar, where it is detected. The amount of energy returned to the radar (i.e., the radar cross-section) depends on the size of the target and the range to the target. Smaller objects, non-metallic objects, and irregular objects will, in general, reflect a much smaller amount of energy, and hence, have a shorter detection range. The tag of some embodiments captures a portion of the emitted radar signal, amplifies it, and sends it back to the radar, resulting in a significantly larger signal being returned to the radar than the small reflected signal that would be received without amplification.

For comparison, at X-band, an automobile has an RCS of around 20 decibels (dB), whereas an adult person is around 0 dB. Using relatively modest 7 dB gain patch antennas and a modest 10 dB amplifier gives an effective RCS of 24 dB, which is approximately 2.5 times the RCS of a car (decibels are on a logarithmic scale). In some embodiments, the effective RCS could be ten times or more than that of a car. At the 76 GHz type frequencies of a typical vehicle radar, such a tag should perform well. For example, Toyota has made measurements of vehicle and pedestrian cross-sections in Naoyuki Yamada, "Three-Dimensional High Resolution Measurement of Radar Cross Section for Car in 76 GHz Band," http://www.tytlabs.com/english/review/rev362epdf/e362_064yamada.pdf (2004) and Naoyuki Yamada, "Radar Cross Section for Pedestrian in 76 GHz Band," R&D Review of Toyota CRDL, Vol. 39, No. 4, pp. 46-51, http://www.tytlabs.com/english/review/rev394epdf/e394_046yamada.pdf (2004). The vehicle cross-section at 76 GHz is around 2 decibels referenced to a square meter (dBsm), whereas the pedestrian cross-section is around −8 dBsm, or approximately 10 dB lower, which translates to a factor of approximately 2 in detection range. While the smaller RF wavelength of some embodiments makes the tag task harder (in general, radar cross-section increases with smaller wavelengths), it is also possible to make much higher gain antennas to make up the difference. For instance, a 15 dB or 20 dB gain horn is very small, and a tag including such a horn should still be practical.

FIG. 1 illustrates a system 100 configured to enhance vehicle detection of objects, according to an embodiment of the present invention. A car 110 includes a radar system 112, shown generally here as a square. Radar system 112 transmits an RF signal at a certain wavelength (e.g., 76 GHz), shown here as an arrow towards bicycle 120.

A portion of the transmitted RF signal is received by a receive antenna (not shown) of tag 122, which is generally shown as a square here and affixed to a bicycle 120. Tag 122 filters and amplifies the portion of the transmitted signal that it received, and then transmits the amplified signal via its transmit antenna (not shown). Radar system 112 then receives a portion of this amplified signal and determines a RCS therefrom. Due to the amplification, the RCS is much larger than would normally be received from a bicycle. Radar 112 detects bicycle 120 sooner than it otherwise would, and passes this information along to car 110, which can then use this information to alert the driver, slow itself, steer in an avoidance maneuver, stop, etc.

In some embodiments, the antenna(s) of the tag(s) should be oriented in direction(s) from which vehicles are likely to come. For instance, a tag could be embedded in a taillight of a motorcycle or affixed to any component or structure of a motorcycle or bicycle such that its antenna(s) are likely to point towards approaching traffic. In some embodiments, multiple tags may be used (see FIG. 6) or a tag may be used with antennas pointing in multiple directions (see FIG. 7).

Figure 2:
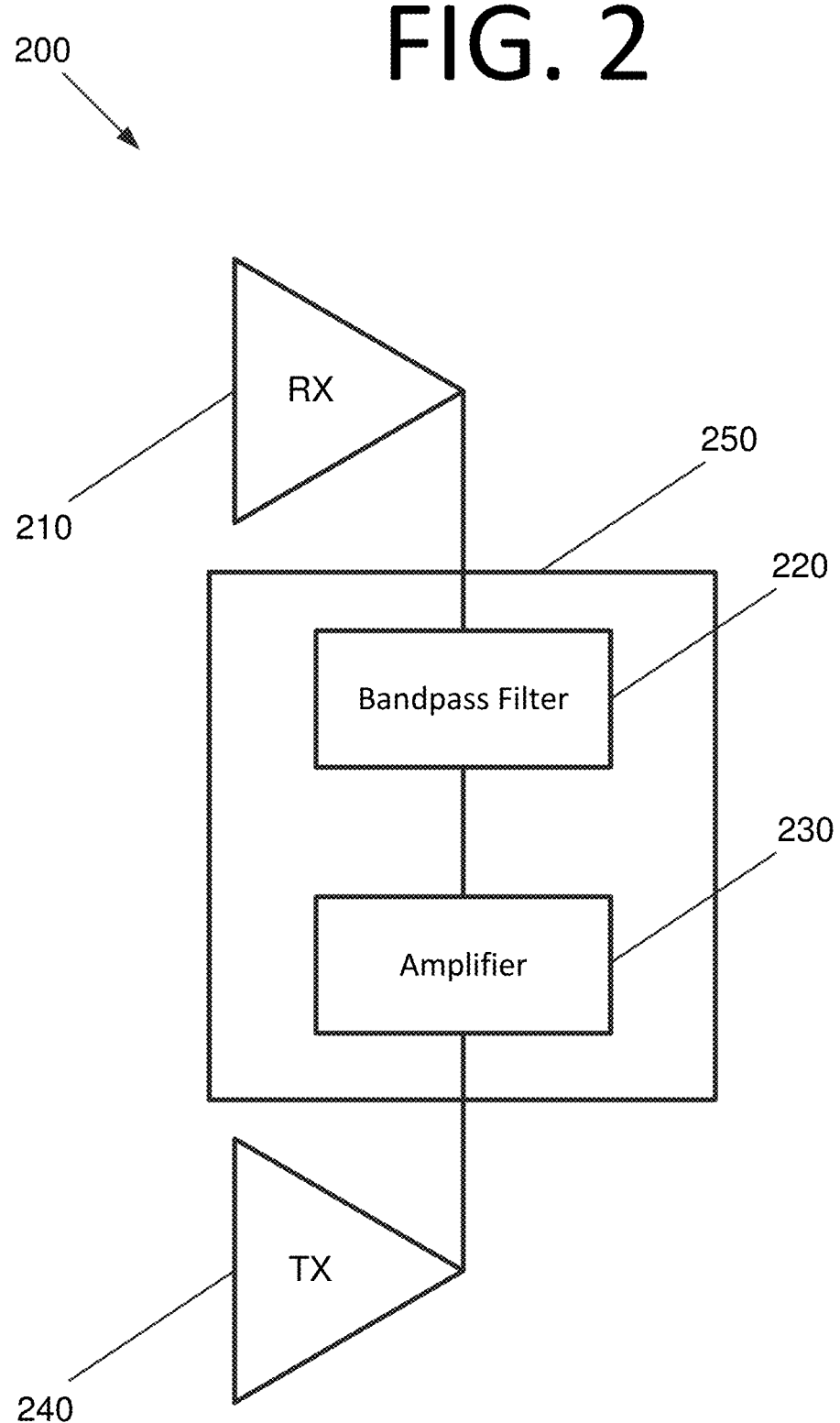
FIG. 2 is an architectural diagram illustrating a tag configured to enhance vehicle radar visibility, according to an embodiment of the present invention.

FIG. 2 is an architectural diagram illustrating a tag 200 configured to enhance vehicle radar visibility, according to an embodiment of the present invention. Tag 200 includes a receive antenna 210 that receives incoming RF signals (e.g., radar signals emitted by radar systems of vehicles). The received signal from receive antenna 210 is then filtered by a bandpass filter 220. Bandpass filter 220 passes frequencies within a certain range (e.g., 70-80 GHz) and rejects (i.e., attenuates) frequencies outside of that range. Thus, bandpass filter 220 may be designed such that only frequencies used by vehicle radar systems (or a portion thereof) are passed through. After being filtered by bandpass filter 220, the signal is sent to an amplifier 230, where it is amplified such that the signal is more powerful than that which was received. The amplified signal is then transmitted by a transmit antenna 240, and the signal may then be received and processed by the radar system. A housing 250 houses bandpass filter 220 and amplifier 230 in this embodiment, and antennas 210, 240 extend outwardly from housing 250 through a hole (not shown) or a physical connection to housing 250. However, in some embodiments, the bandpass filter could be before or after the amplifier without deviating from the scope of the invention. Antennas may be internal, external, or both without deviating from the scope of the invention. Tag 200 receives power from a power source (not shown), either from an internal battery as shown in FIG. 3 or from an external power supply (e.g., a generator on a motorcycle or bicycle, an external battery, a vehicle power system, etc.).

Figure 3:
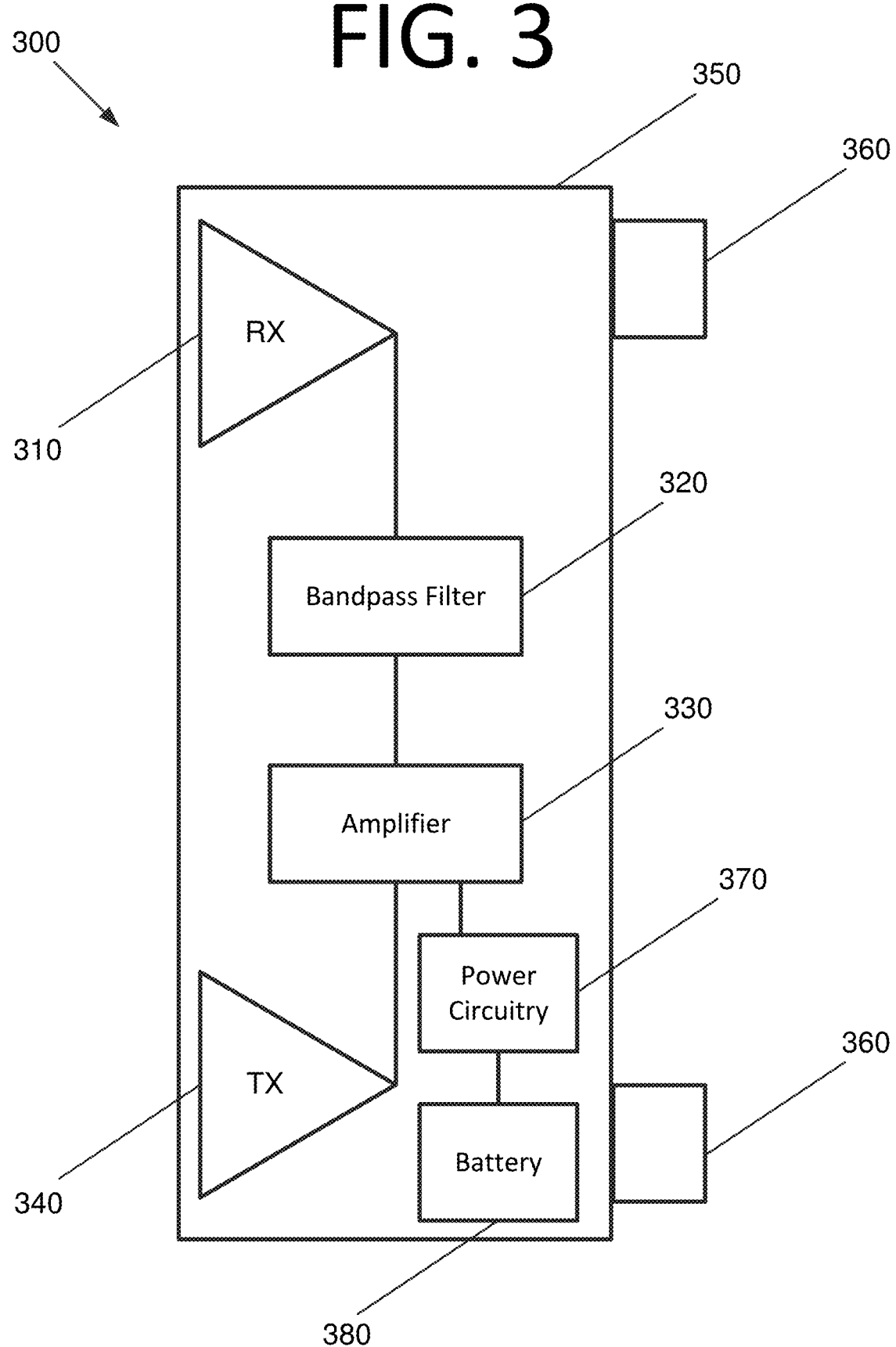
FIG. 3 is an architectural diagram illustrating a tag configured to enhance vehicle radar visibility, according to an embodiment of the present invention.

FIG. 3 is an architectural diagram illustrating a tag 300 configured to enhance vehicle radar visibility, according to an embodiment of the present invention. Similar to tag 200 of FIG. 2, tag 300 includes a receive antenna 310, a bandpass filter 320, an amplifier 330, and a transmit antenna 340. However, unlike tag 200, in tag 300, receive antenna 310, bandpass filter 320, amplifier 330, and transmit antenna 340 are all enclosed within a housing 350. Tag 300 may be connected to any suitable object via connectors 360. Connectors may include, but are not limited to, hardware fasteners, straps, bands, snaps, buttons, adhesives, magnets, or any other suitable connector, or mechanism for connecting to an external connector, object, or portion of an object without deviating from the scope of the invention. As such, tag 300 may be attached to a bicycle, a motorcycle, clothing, a pet collar, and/or an inanimate object, worn by personnel (e.g., around a person's wrist, hung from their neck, etc.), or any combination thereof.

In this embodiment, tag 300 also includes power circuitry 370 and a battery 380. Providing power to amplifier 330 allows tag 300 to provide a higher RCS than the object to which it is attached would normally do. As such, the object associated with tag 300 may be detected sooner by the radar of a vehicle.

Per the above, it is important that the antenna-to-antenna isolation, measured in dB, be higher than the amplifier gain. Antenna-to-antenna isolation can be increased by increasing the physical separation between the send and receive antennas, using different antenna polarizations, using higher gain antennas (narrower beam pattern), and/or reducing the correlation coefficient between the antenna radiation patterns of the antennas (i.e., configuring the antennas such that the peak radiation for each antenna is in different or opposite directions). As long as the antenna-to-antenna isolation is greater than the gain of the amplifier, the tag will not oscillate. The filter is also important to keep the tag from oscillating.

Figure 4:
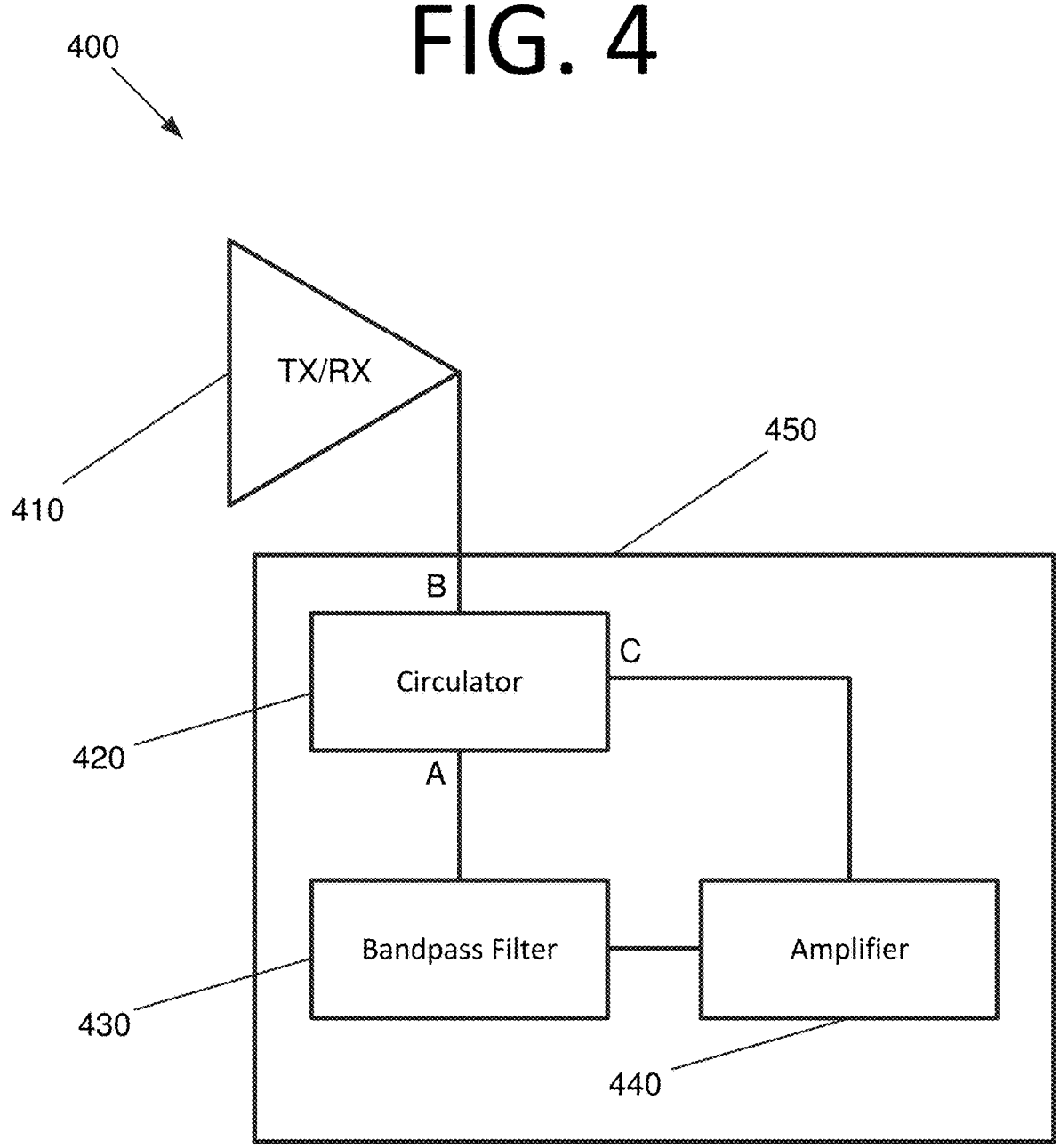
FIG. 4 is an architectural diagram illustrating a tag configured to enhance vehicle radar visibility, according to an embodiment of the present invention.

FIG. 4 is an architectural diagram illustrating a tag 400 configured to enhance vehicle radar visibility, according to an embodiment of the present invention. Tag 400 includes a transmit/receive antenna 410 that receives incoming RF signals (e.g., radar signals emitted by radar systems of vehicles) and transmits an amplified signal. Received signals from receive antenna 410 are provided to a circulator 420. A circulator is a directional device. The signal received by antenna 410 enters port B of circulator 420. Circulator 420 outputs this signal to port C, at which point it is filtered by bandpass filter 430, amplified by amplifier 440, input to port A of circulator 420, and the output by circulator 420 to antenna 410 via port B. A housing 450 houses circulator 420, bandpass filter 430 and amplifier 440 in this embodiment, and antenna 410 extends outwardly from housing 450 through a hole (not shown) or a physical connection to housing 450. Tag 400 receives power from a power source (not shown).

Figure 5:
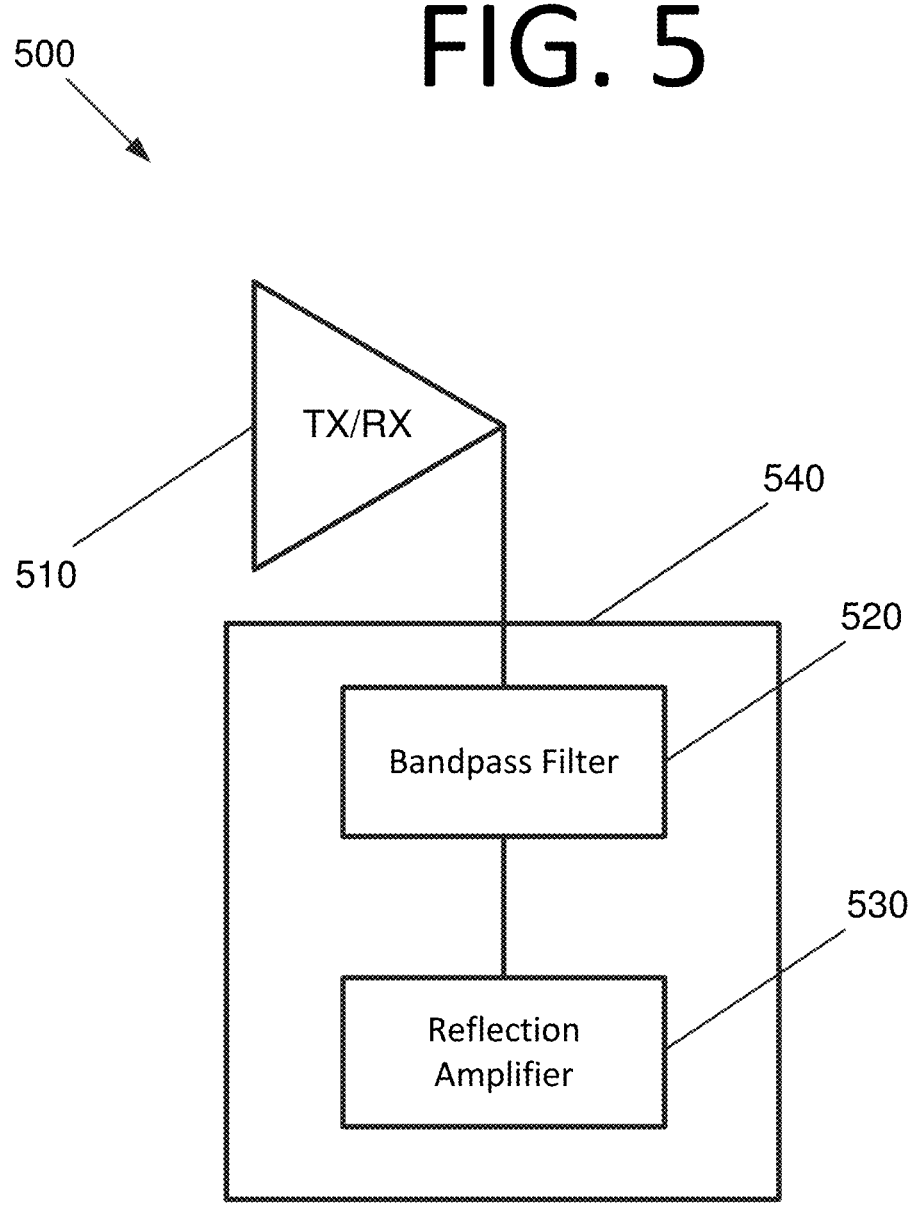
FIG. 5 is an architectural diagram illustrating a tag configured to enhance vehicle radar visibility, according to an embodiment of the present invention.

FIG. 5 is an architectural diagram illustrating a tag 500 configured to enhance vehicle radar visibility, according to an embodiment of the present invention. Tag 500 includes a transmit/receive antenna 510 that receives incoming RF signals (e.g., radar signals emitted by radar systems of vehicles) and transmits an amplified signal. Antenna 510 provides a received signal to bandpass filter 520, which filters the received signal and provides the filtered signal to a reflection amplifier 530 (also known as a negative resistance amplifier). Reflection amplifier 530 is a one-port device that amplifies the filtered signal and reflects the amplified filtered signal back down the signal path to bandpass filter 520 and on to antenna 510 to be transmitted. A housing 540 houses bandpass filter 520 and reflection amplifier 530 in this embodiment, and antenna 510 extends outwardly from housing 540 through a hole (not shown) or a physical connection to housing 540. Tag 400 receives power from a power source (not shown).

Figure 6:
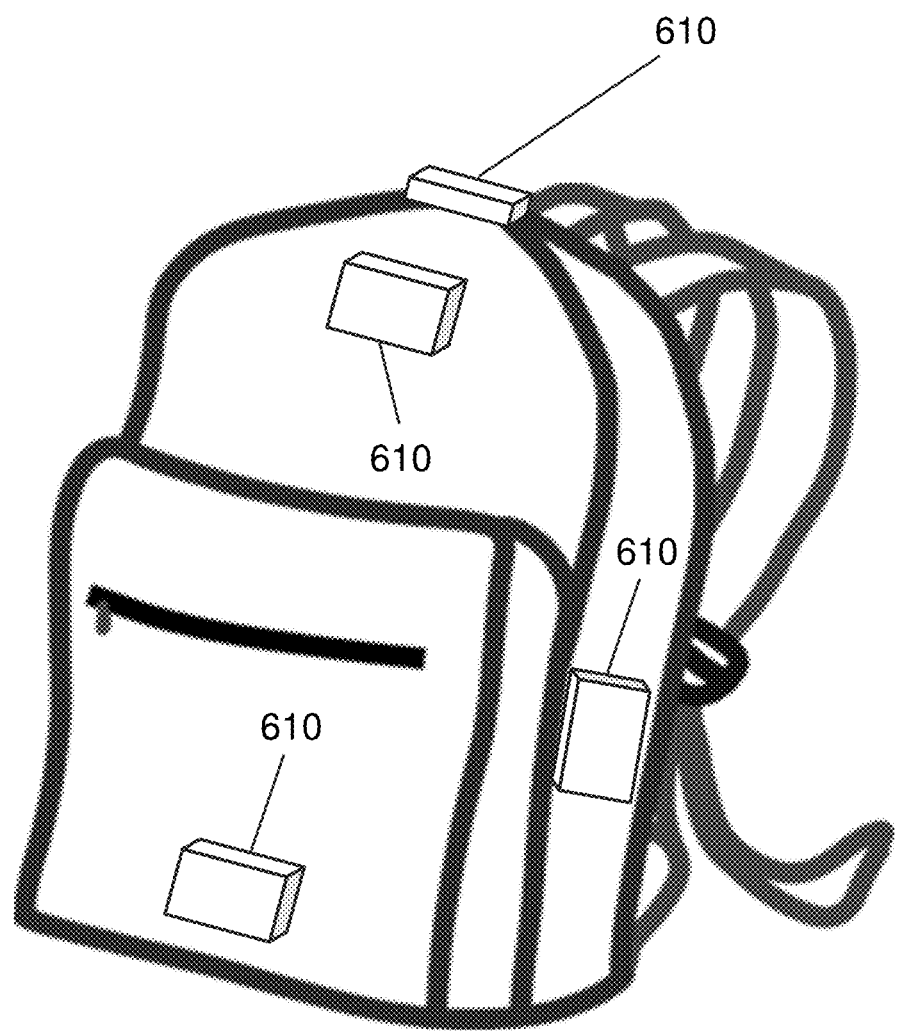
FIG. 6 is a perspective view illustrating a backpack with multiple affixed tags, according to an embodiment of the present invention.

Per the above, in some embodiments, multiple tags may be used or a tag may be used with antennas pointing in multiple directions. FIG. 6 is a perspective view illustrating a backpack 600 with multiple affixed tags 610, according to an embodiment of the present invention. For ease of illustration, tags 610 are shown as boxes here, but may have any desired shape and size, and may have external antennas, internal antennas, or both, without deviating from the scope of the invention. Also, while a backpack is shown here, tags 610 could be affixed to any desired object. Furthermore, at least two of tags 610 may have different architectures from one another, and may have any of the single or multiple antenna configurations discussed herein without deviating from the scope of the invention.

In this embodiment, a child's backpack 600 has affixed tags 610 with antennas pointing in different directions. This increases the likelihood that an incoming signal from a vehicle radar system will be received by one of the antennas, amplified, and transmitted back in a manner that can be received by the vehicle's radar system. Thus, as a child moves and turns, it is more likely that the child's RCS will be enlarged from the vehicle's perspective.

Figure 7:
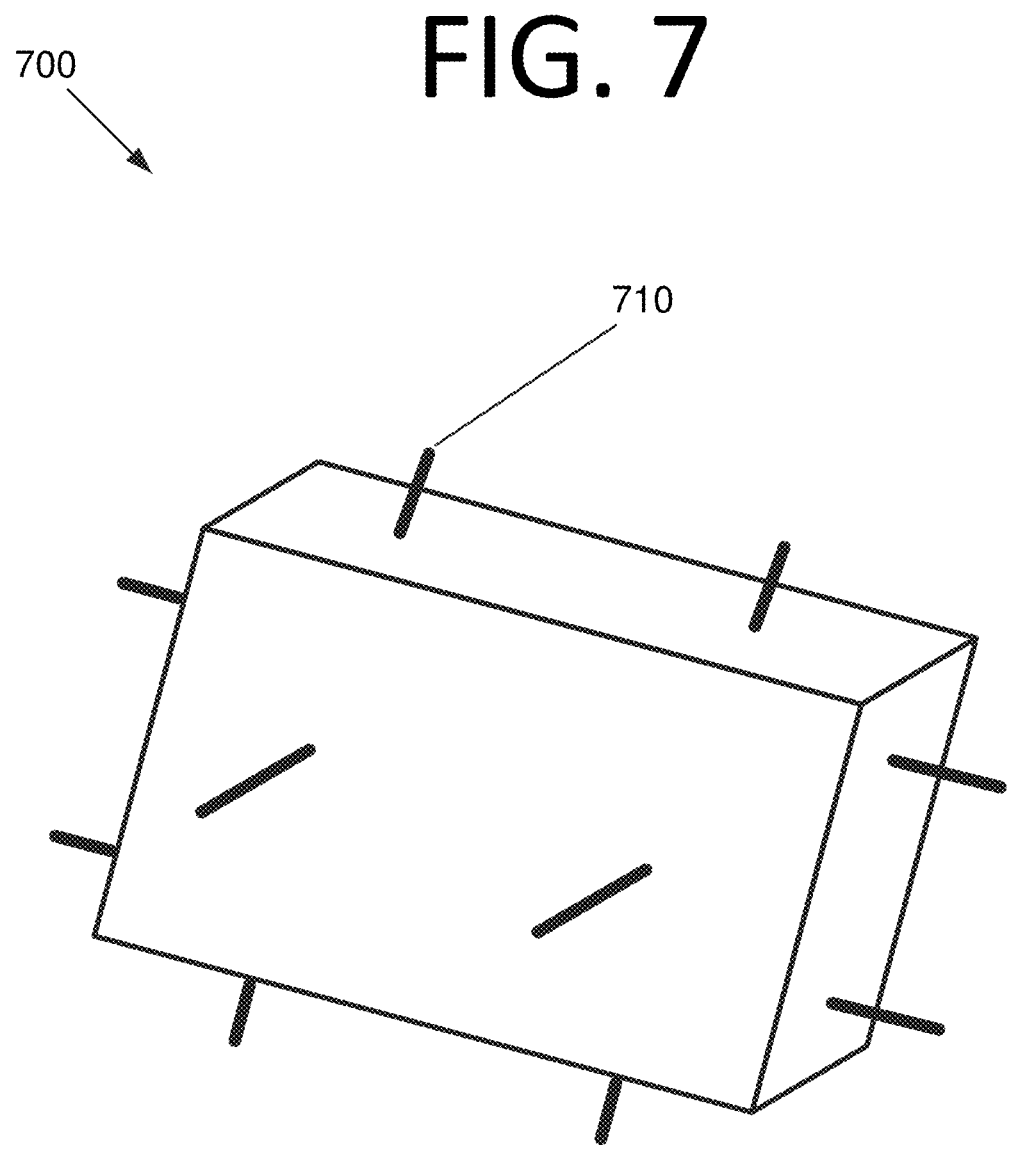
FIG. 7 is a perspective view illustrating a tag with antennas pointing in multiple directions, according to an embodiment of the present invention.

FIG. 7 is a perspective view illustrating a tag 700 with external antennas 710 pointing in multiple directions, according to an embodiment of the present invention. In this embodiment, tag 700 has a box shape, but any suitable shape (pyramid, sphere, irregular, multiple joined shapes, etc.) may be used without deviating from the scope of the invention. Tag 700 has antennas 710 oriented 90 degrees with respect to the front, top, bottom, and sides of tag 700. However, any desired antenna orientation may be used without deviating from the scope of the invention, and any desired number of antennas may be used. Furthermore, antennas on a single face may be oriented in different directions. Furthermore, any type or types of electronic system(s) disclosed herein may be used in a single tag 700.

It will be readily understood that the components of various embodiments of the present invention, as generally described and illustrated in the figures herein, may be arranged and designed in a wide variety of different configurations. Thus, the detailed description of the embodiments of the present invention, as represented in the attached figures, is not intended to limit the scope of the invention as claimed, but is merely representative of selected embodiments of the invention.

The features, structures, or characteristics of the invention described throughout this specification may be combined in any suitable manner in one or more embodiments. For example, reference throughout this specification to "certain embodiments," "some embodiments," or similar language means that a particular feature, structure, or characteristic described in connection with the embodiment is included in at least one embodiment of the present invention. Thus, appearances of the phrases "in certain embodiments," "in some embodiment," "in other embodiments," or similar language throughout this specification do not necessarily all refer to the same group of embodiments and the described features, structures, or characteristics may be combined in any suitable manner in one or more embodiments.

It should be noted that reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention can be practiced without one or more of the specific features or advantages of a particular embodiment. In other instances, additional features and advantages may be recognized in certain embodiments that may not be present in all embodiments of the invention.

One having ordinary skill in the art will readily understand that the invention as discussed above may be practiced with steps in a different order, and/or with hardware elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention. In order to determine the metes and bounds of the invention, therefore, reference should be made to the appended claims.

The invention claimed is:

1. A tag, comprising:
a first antenna configured to receive a signal;
a bandpass filter configured to receive the signal from the first antenna and to allow a portion of a frequency range of the signal from the first antenna through;
an amplifier configured to receive and amplify the filtered signal from the bandpass filter such that the amplified signal is more powerful than the received signal; and
a second antenna configured to transmit the amplified signal, wherein
the tag, via the amplifier and the second antenna, is configured to increase an effective radar cross-section of an object to which the tag is affixed or with which the tag is otherwise incorporated, thereby making the object appear larger to a radar system external to the object, and
the first antenna, the second antenna, and the amplifier are configured such that antenna-to-antenna isolation between the first antenna and the second antenna is greater than a gain of the amplifier.

2. The tag of claim 1, wherein the first antenna and the second antenna are 7 dB patch antennas and the amplifier is a 10 dB amplifier, providing an effective radar cross-section (RCS) of 24 dB.

3. The tag of claim 1, wherein the bandpass filter and the amplifier are contained within a housing, and the first antenna and the second antenna are at least partially external to the housing.

4. The tag of claim 1, wherein the tag is configured to give an effective radar cross-section (RCS) of 30 dB or more.

5. The tag of claim 1, wherein the tag is configured to be attached to a bicycle, a motorcycle, clothing, a pet collar, and/or an inanimate object, worn by personnel, or any combination thereof.

6. The tag of claim 1, wherein the tag comprises three or more antennas, at least two of which are oriented in different directions.

7. The tag of claim 1, further comprising:
a circulator between the first antenna and the bandpass filter that is operably connected to the first antenna, the bandpass filter, and the amplifier via first, second, and third ports, respectively, wherein the bandpass filter and the amplifier are operably connected to one another,
the circulator is configured to receive the signal from the first antenna via the first port and output the received signal to the bandpass filter via the second port, which is filtered by the bandpass filter, amplified by the amplifier, and input back to the circulator via the third port,
the circulator is configured to output the amplified signal back to the first antenna via the first port, and
the first antenna is configured to then transmit the amplified signal.

8. The tag of claim 1, wherein the amplifier is a reflection amplifier configured to receive the filtered signal from the bandpass filter, amplify the filtered signal, and reflect the amplified signal back down a signal path to the bandpass filter, and on to the first antenna, which transmits the amplified signal.

9. A tag, comprising:
a receive antenna configured to receive a signal; and
a bandpass filter configured to receive the signal from the receive antenna and to allow a portion of a frequency range of the signal from the receive antenna through;
an amplifier configured to receive and amplify the filtered signal from the bandpass filter; and
a transmit antenna configured to transmit the amplified signal, wherein
the receive antenna, the transmit antenna, and the amplifier are configured such that antenna-to-antenna isolation between the receive antenna and the transmit antenna is greater than a gain of the amplifier.

10. The tag of claim 9, wherein the receive antenna and the transmit antenna are 7 dB patch antennas and the amplifier is a 10 dB amplifier, providing an effective radar cross-section (RCS) of 24 dB.

11. The tag of claim 9, wherein the tag is configured to give an effective radar cross-section (RCS) of 30 dB or more.

12. The tag of claim 9, wherein the bandpass filter and the amplifier are contained within a housing, and the first antenna and the second antenna are at least partially external to the housing.

13. The tag of claim 9, wherein the receive antenna and the transmit antenna are oriented in different directions.

14. A tag, comprising:
a plurality of antennas, at least two of the plurality of antennas oriented in different directions;
a bandpass filter configured to receive a signal from at least one of the plurality of antennas and to allow a portion of a frequency range of the received signal through; and
an amplifier configured to receive and amplify the filtered signal from the bandpass filter such that the amplified signal is significantly more powerful than the received signal, wherein
the plurality of antennas of the tag are oriented such that radar signals from vehicles approaching from at least two directions can be received, amplified, and retransmitted with a larger RCS.

15. The tag of claim 14, wherein the plurality of antennas are 7 dB patch antennas and the amplifier is a 10 dB amplifier, providing an effective radar cross-section (RCS) of 24 dB.

16. The tag of claim 14, wherein the tag is configured to give an effective radar cross-section (RCS) of 30 dB or more.

17. The tag of claim 14, wherein the bandpass filter and the amplifier are contained within a housing, and the plurality of antennas are at least partially external to the housing.

18. The tag of claim 14, wherein the tag is configured to be attached to a bicycle, a motorcycle, clothing, a pet collar, and/or an inanimate object, worn by personnel, or any combination thereof.

* * * * *